(12) United States Patent
Landa

(10) Patent No.: US 8,773,731 B2
(45) Date of Patent: Jul. 8, 2014

(54) METHOD FOR CAPTURING HIGH-QUALITY DOCUMENT IMAGES

(75) Inventor: Pedro Landa, Austin, TX (US)

(73) Assignee: uFollowit, Inc., Austin, TX (US)

( * ) Notice: Subject to any disclaimer, the term of this patent is extended or adjusted under 35 U.S.C. 154(b) by 121 days.

(21) Appl. No.: 13/448,936

(22) Filed: Apr. 17, 2012

(65) Prior Publication Data

US 2013/0271796 A1 Oct. 17, 2013

(51) Int. Cl.
*H04N 1/04* (2006.01)
*H04N 1/407* (2006.01)
*H04N 1/387* (2006.01)
*H04N 1/409* (2006.01)

(52) U.S. Cl.
CPC ............ *H04N 1/409* (2013.01); *H04N 1/4072* (2013.01); *H04N 1/387* (2013.01)
USPC .......................................... 358/474; 358/463

(58) Field of Classification Search
None
See application file for complete search history.

(56) References Cited

U.S. PATENT DOCUMENTS

| | | | |
|---|---|---|---|
| 4,731,671 A * | 3/1988 | Alkofer | 382/274 |
| 6,873,732 B2 | 3/2005 | Dance | |
| 7,949,176 B2 | 5/2011 | Nepomniachtchi | |
| 8,345,106 B2 * | 1/2013 | Nijemcevic et al. | 348/207.1 |
| 8,406,554 B1 * | 3/2013 | Saha et al. | 382/270 |
| 8,483,473 B2 * | 7/2013 | Roach et al. | 382/137 |
| 2003/0086615 A1 * | 5/2003 | Dance et al. | 382/200 |
| 2007/0206877 A1 * | 9/2007 | Wu et al. | 382/275 |
| 2009/0110194 A1 * | 4/2009 | Athsani et al. | 380/200 |
| 2009/0185241 A1 * | 7/2009 | Nepomniachtchi | 358/474 |
| 2010/0073735 A1 | 3/2010 | Hunt | |
| 2011/0035662 A1 * | 2/2011 | King et al. | 715/273 |

* cited by examiner

*Primary Examiner* — Dung Tran
(74) *Attorney, Agent, or Firm* — Michael J Williams

(57) ABSTRACT

A method for capturing high-quality document images, comprising steps which first attempt to correct deficiencies in a captured image, then subsequently score the corrected image for quality, and finally, use the score to determine whether the image quality is acceptable. Unacceptable images are flagged for recapture. Corrected deficiencies comprise exposure, geometric distortions and extraneous background. Scored attributes comprise focus, contrast, and legibility.

10 Claims, 3 Drawing Sheets

FUNCTIONAL OVERVIEW OF A SOPHISTICATED PREFERRED EMBODIMENT

A SAMPLE IMAGE AT VARIOUS STEPS WITHIN A PREFERRED EMBODIMENT

(a) Original as Captured (b) Cropped & Geo-Corrected (c) Re-Cropped (d) Contrast Enhanced

METHOD FOR CAPTURING HIGH-QUALITY DOCUMENT IMAGES

BACKGROUND OF THE INVENTION

1. Field of the Invention

The present invention relates to the field of document capture and management and, in particular, to techniques for insuring high-quality document capture.

2. Description of the Related Art

There are many known techniques related to both image enhancement and analysis. However, current high-quality image capture solutions typically rely upon a flatbed scanning device, where both the orientation of the document and the direction and quality of the light source can be carefully controlled. Under these circumstances, there is little need to later correct for poor lighting or geometric distortion, as the light source is typically both ample and uniform, and the target document is held flat and perpendicular to both the camera and the light source.

With the recent promulgation of electronic cameras and smart phones offering high-pixel counts, it is becoming possible to capture a document with resolution on par with a flat-bed scanner. However, a camera or smart phone is typically used within less-than-ideal lighting conditions, and further, the camera or smart phone is often not held perpendicular to the target document during capture. The present invention assembles a number of known technologies in a novel way, in order to facilitate high-quality document capture using a camera, smart phone, or other similar device.

BRIEF SUMMARY OF THE INVENTION

The use of cameras, smart phones, and other non-traditional devices to capture documents presents certain challenges that are not encountered with traditional flat-bed scanners. For instance, one common problem is the lack of a controlled light source.

Often the only light source available is either too dim, or produces dare or uneven lighting of the target document. Sometimes these shortcomings can be corrected after-the-fact using electronic image processing, but often the only real remedy is to reposition the document relative to the light source and try again.

Another common problem is that the capture device is held at an incorrect angle or at too much of a distance with respect to the target document. This produces distorted geometry in the first case, and an excessive border in the second. Unlike poor lighting, these shortcomings can often be corrected electronically, as the high pixel count found in modern devices is often sufficient to support the required geometric transformations, while still ultimately delivering the required resolution. However, in certain cases, the distortion or excessive border can be too extreme, or the capture device might not offer sufficient resolution. Thus, sometimes the only remedy is to better position the camera relative to the target document and try again.

The present invention comprises solutions to each of the problems delineated above. Generally, the present invention comprises steps which first attempt to correct deficiencies in a captured mage using a variety of techniques, then subsequently score the corrected image for quality, and finally, use the score to determine whether the image quality is acceptable. If an image is deemed unacceptable, it is flagged for re-capture, and in some embodiments, feedback is immediately provided to a user, so that another attempt to better capture a target document can be quickly initiated. Note that image processing need not necessarily be confined to the device used at the point of capture. Given that modern devices, often have access to either local or wide-area networks, captured images can be readily transferred to more powerful computing devices where further image processing can be performed.

For example, in at least one preferred embodiment, document images are first captured on a smart phone, and then initially processed on the phone to correct for geometric distortion. Images are then transferred to a remote server, where they are further processed to correct for lighting deficiencies, and then scored for quality. Images that are deemed to be of sufficient quality are then accepted. In cases where image quality is deemed unacceptable, the server instructs the phone to inform its user that the captured document has not been accepted, upon which the user typically chooses to try again.

One of the keys to replicating the high-quality results of a flat-bed scanner, is to not only correct for geometrical distortions, but further, to remove any background that has been inadvertently captured. Flat-bed scanners almost universally have a white background, and thus, if there is anything captured beyond the edges of the document, it will display as white. When using an device that must be manually positioned, such as a smart phone or electronic camera, often the image will contain both the target document and parts of the background against which the target document was placed during capture. Thus, at least one preferred embodiment comprises a step which facilitates the cropping of the document image, to remove the unwanted background.

BRIEF DESCRIPTION OF THE DRAWINGS

FIG. 2 presents a functional overview of a more sophisticated preferred embodiment, in that it comprises the additional steps of:

re-cropping the target image;

sharpening, enhancing the contrast of, and color-correcting the target image: and transferring the target image to a workflow server.

Figure 1:
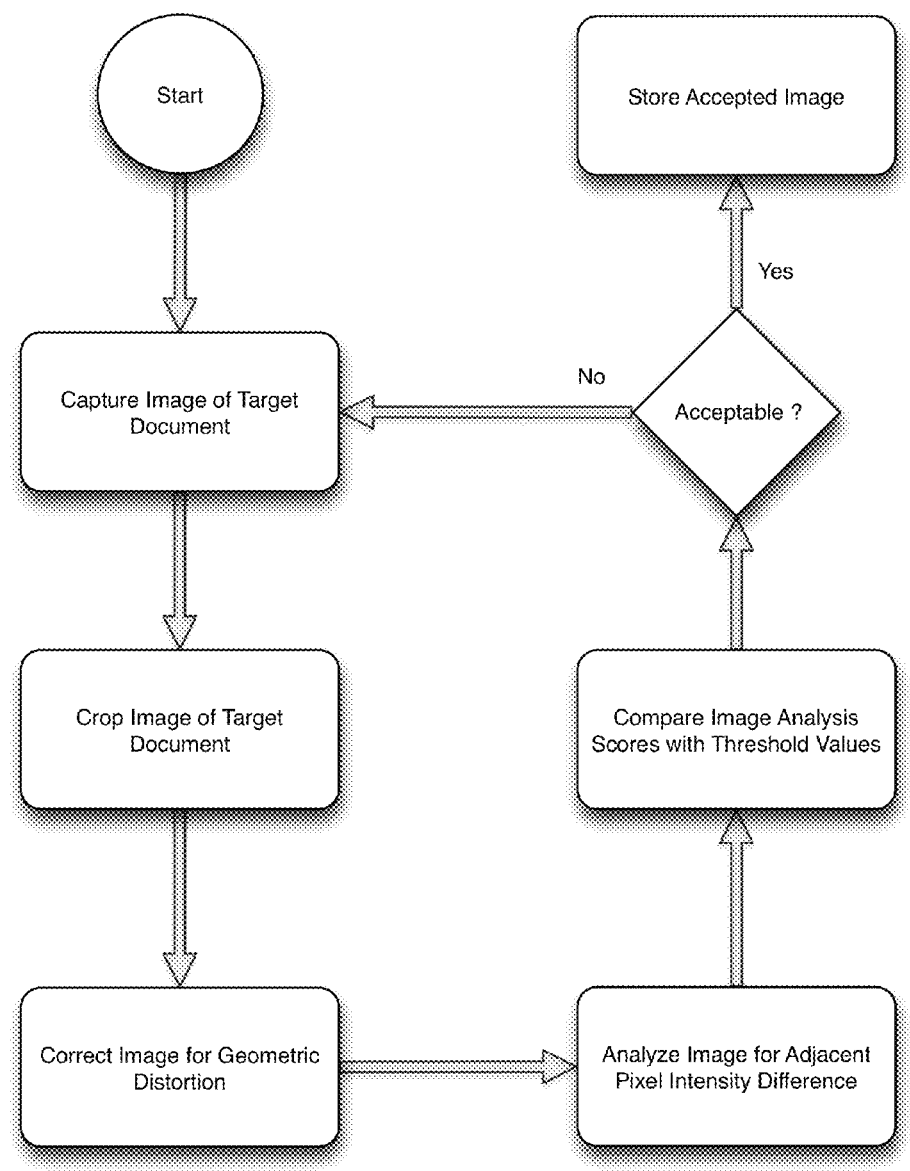
FIG. 1 presents a functional overview of a simple preferred embodiment.
Figure 2:
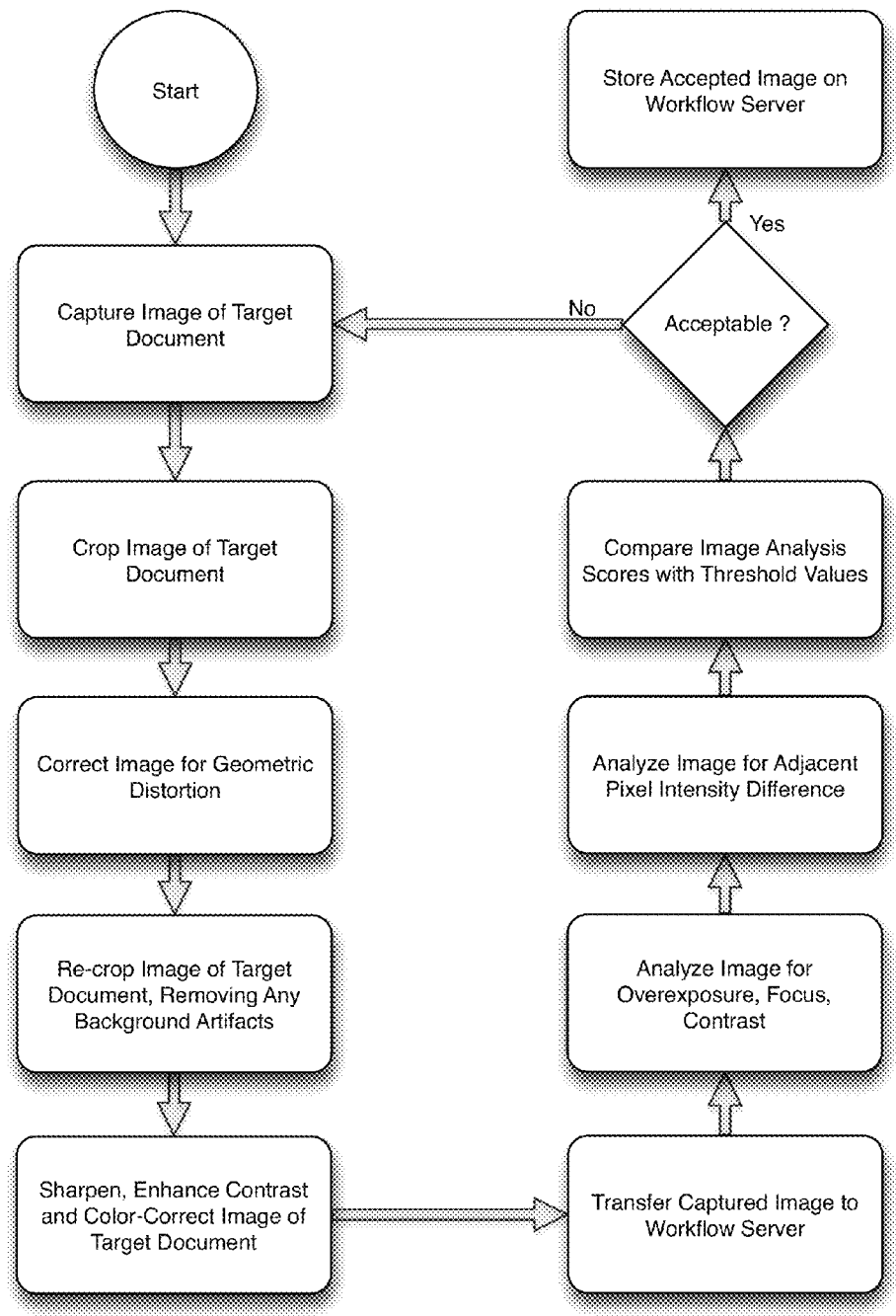
Figure 3:
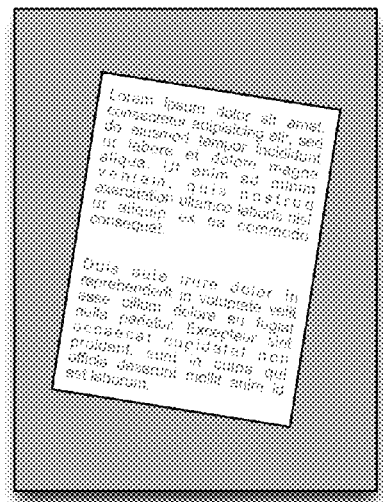
Figure 3:
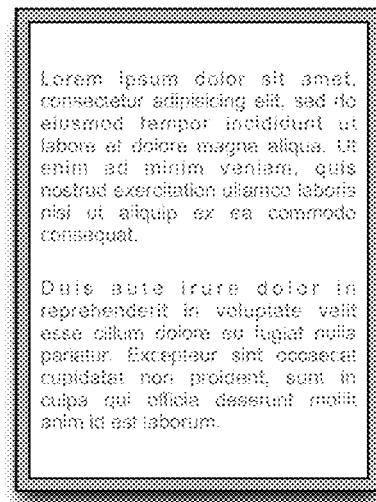
Figure 3:
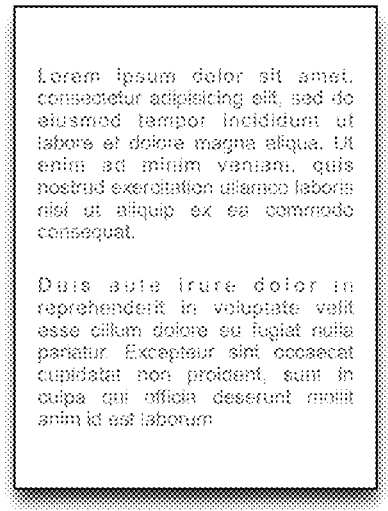
Figure 3:
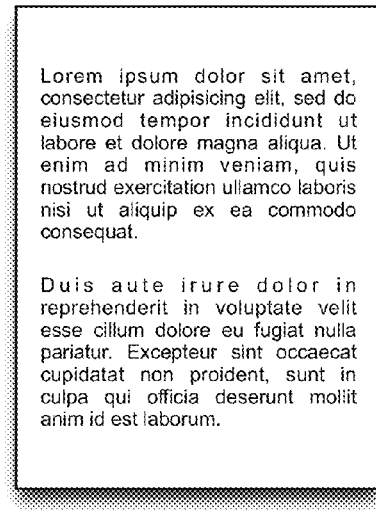

FIG. 3 presents the content of a sample image at various points along the sequential steps of a preferred embodiment.

DETAILED DESCRIPTION OF THE INVENTION

Using a camera, smart phone, and other non-traditional device to scan a document with high-quality results comprises the following steps: initial image capture, processing the captured image, scoring the processed image, and using the score to accept/reject the document image.

The initial image capture can be initiated by either a machine or a user. In at least one preferred embodiment, a handheld electronic image capture device is positioned by a user, who attempts to align the document within a viewfinder, and then initiates capture. In at least one preferred embodiment, a capture device is mounted in a fixed orientation. In at least one preferred embodiment, capture is initiated automatically based upon a pressure sensitive trigger that senses when a document has been placed within the field of the capture device camera. In at least one preferred embodiment, capture is initiated automatically based upon a software trigger that senses when a document has been placed within the field of the capture device camera. In a plurality of preferred embodiments, the captured image is saved in raw, jpeg, png, tiff, bmp, and/or gif formats. In a plurality of preferred embodiments, the captured image is saved in ram, rom, prom, eprom, on a flash device, on a magnetic disk drive, on an optical drive, on a network drive, and/or on a storage solution assessable via a wireless network, local area network, wide-area network, internet, and/or within the cloud.

In at least one preferred embodiment, the captured image is then electronically processed to better simulate the quality results of a traditional capture device such as a flat-bed scanner. Image processing options include conversion to grayscale, contrast enhancement, noise reduction, color correction, glare reduction, perspective transformation to correct for suboptimal camera placement orientation during capture, and/or cropping to discard any extraneous background captured. In at least one preferred embodiment, the captured image is presented to a user, a cropping quadrilateral is superimposed upon said image, and the user is instructed to reposition said cropping quadrilateral so as to coincide with the edges of the target document, whereupon the user then repositions said cropping quadrilateral and initiates a cropping operation. In at least one preferred embodiment, the edges of the target document are detected and the cropping quadrilateral is then initially aligned with said edges. In at least one preferred embodiment, the cropping quadrilateral is used to both crop and correct for any suboptimal camera placement orientation during capture.

Two of the above-described processing steps are particularly useful in replicating the high-quality image capture results that are typically obtained by using a traditional image capture device such as a flat-bed scanner. Because traditional image capture devices often hold the target document in a particular position relative to the camera, said devices capture images relatively free of geometric distortions and extraneous background. For instance, images captured using a handheld device such as a smart phone will often include some amount of extraneous background and are often geometrically distorted to some degree because the camera was not centered or held exactly perpendicular to the target document at the time of capture. These two processing options are interrelated in that they both rely upon accurate edge detection of the target document, in at east one preferred embodiment, the edges of the target document are first automatically detected using one or more software algorithms known to those well versed in the art. Then a cropping quadrilateral is presented to a user, whereupon said user is given the capability to adjust the quadrilateral, to more faithfully indicate the actual edges of said document. Finally, the resulting quadrilateral is used as the basis for both the cropping and the perspective transformation of the target image, such that any extraneous background and/or geometric distortion is removed.

Geometric distortion correction is predicated upon the assumption that the target document is a rectangle. A perspective transformation is utilized which converts the quadrilateral into a target rectangle, said target rectangle being assigned an aspect ratio based upon the mathematical properties of the quadrilateral. Note that the perspective transform is used because it preserves straight lines.

The target aspect ratio r is calculated as follows:

$$A = \begin{bmatrix} f & 0 & w \\ 0 & f & h \\ 0 & 0 & 1 \end{bmatrix} \quad (1)$$

$$m1 = \begin{bmatrix} x1 \\ y1 \\ 1 \end{bmatrix} \quad m2 = \begin{bmatrix} x2 \\ y2 \\ 1 \end{bmatrix} \quad m3 = \begin{bmatrix} x3 \\ y3 \\ 1 \end{bmatrix} \quad m4 = \begin{bmatrix} x4 \\ y4 \\ 1 \end{bmatrix} \quad (2)$$

$$n2 = (((m1 \times m4) \cdot m3) \div ((m2 \times m4) \cdot m3))m2 - m1 \quad (3)$$

$$n3 = (((m1 \times m4) \cdot m2) \div ((m2 \times m4) \cdot m2))m3 - m1 \quad (4)$$

$$r = \sqrt{\frac{n2^T A^{-T} A^{-1} n2}{n3^T A^{-T} A^{-1} n3}} \quad (5)$$

where f is the focal length of the image capture device's camera, w is the width of the original image, h is the height of the original image, and x1, y1, x2, y2, x3, y3, x4, & y4 are the xy coordinates of the upper-left, lower-left, upper-right, and lower-right corners of the quadrilateral representing the edges of the document as positioned within the original image.

In at least one preferred embodiment, cropping is performed in two-steps. First, auto-edge detection is used to initially align a cropping quadrilateral with the edges of the target document, and both the document mage and the superimposed cropping quadrilateral are presented to a user. The user then optionally adjusts the quadrilateral to better indicate the actual edges of the harder document. Finally, the quadrilateral is used as input to a second auto-edge detection operation, which removes any extraneous background that would otherwise be included within the cropped image. This second auto-edge detection is useful, because a user will often inadvertently adjust the cropping quadrilateral in such a way as to leave a small slice of extraneous background near one or more of the document edges. If the background matches the document, then this is not particularly noticeable. But more often than not, the background will not match the document in color or texture, in which case it becomes a distraction.

In at least one preferred embodiment, the captured image is temporarily divided into sub-images. Said sub-images are then processed individually, using parameters some of which are shared and some of which are specific to a particular sub-image or set of sub-images. The processed sub-images are then recombined in a later step.

In at least one preferred embodiment, the captured image is further processed to enhance its contrast, color fidelity, and sharpness, using techniques well known in the art. In at least one preferred embodiment, an optional noise reduction step is also available.

Once the captured image has been sufficiently processed, it is then analyzed by computer and assigned an image quality score (IQS). Note that in at least one preferred embodiment the processing step is performed initially on the capture device, after which the image is transferred electronically to a second device where it is further processed, analyzed and scored.

In at least one preferred embodiment, the IQS calculation comprises the following steps:

(1) convert captured image electronic representation to grayscale, (2) create a vector of delta values between adjacent horizontal pixels, (3) calculate a first mean by averaging said delta values, (4) for each delta value, square the difference between it and said first mean, (5) calculate a second mean by averaging said squared differences, (6) assign the Log10 of said second mean as the IQS.

In a plurality of preferred embodiments, the IQS is calculated using a variety of analytical techniques well known in the arts, including but not limited to:

(1) overexposure: analyzing image pixels for degree of saturation, (2) focus: analyzing the spacial frequencies of a Fourier transform, (3) contrast: analyzing one or more histograms of pixel channel values, When a captured image has been scored, its score is then compared to one or more threshold values, and a determination is thereby made as to whether the image is of sufficient submission quality. The one or more threshold values are set using a variety of criteria, based upon the intended purpose of the document image. In at least one preferred embodiment, the threshold is set dynamically depending upon at least one external input value.

If a captured image is scored and deemed acceptable for submission, then said image is accepted and made available for further processing or distribution. If instead a captured image is scored and deemed unacceptable, then in at least one preferred embodiment, this rejection is relayed to a user, who then decides on a further course of action. In at least one preferred embodiment, said user is given the opportunity to override the rejection and force acceptance of the captured document image. In at least one preferred embodiment, a user may elect to recapture the target document. In at least one preferred embodiment, said user is provided with feedback regarding the reason for rejection, for example a lack of sufficient contrast. Said user is then instructed to take corrective action, with the goal of improving the quality of the subsequent captured image.

I claim:

1. A method for capturing high-quality document images, comprising the steps of:
    acquiring, by electronic device, an electronic representation of an image containing at least a first document;
    scoring said image by;
        converting said electronic image representation to grayscale;
        creating a vector of delta values between adjacent horizontal pixels;
        calculating a first mean by averaging said delta values
        for each delta value, squaring the difference between it and said first mean;
        calculating a second mean by averaging said squared differences; and
        assigning the Log10 of said second mean as the image quality score
    associating said image with said image quality score;
    comparing said image quality score with a threshold value; and
    accepting said image for further use, only if said image quality score equals or exceeds said threshold value.

2. The method of claim 1, wherein the step of acquiring, by electronic device, an electronic representation of an image containing at least a first document, is further comprised of:
    transforming said electronic representation, such that any geometric distortions are either minimized or fully eliminated.

3. The method of claim 1, wherein the step of acquiring, by electronic device, an electronic representation of an image containing at least a first document, is further comprised of:
    enhancing said electronic representation, by performing at least one of:
        increasing its contrast; and
        reducing its noise.

4. The method of claim 1, wherein the step of scoring said image is further comprised of:
    at least one of:
    detecting overexposure within said image, by inspecting said electronic representation for saturated pixels;
    detecting degree of focus within said image, by performing a Fourier transform on said electronic representation and examining the resulting spacial frequencies;
    detecting contrast within said image, by generating at least a first histogram for said electronic representation, and calculating a mean and standard deviation quantity for said at least a first histogram; and
    detecting contrast within said image, by inspecting said electronic representation for adjacent pixel intensity difference.

5. The method of claim 1, wherein the step of accepting said image for further use, is further comprised of:
    presenting to a user the opportunity to reacquire a new electronic representation of a new image containing at least a first document, where said score does not equal or exceed said threshold value.

6. The method of claim 1, wherein the step of scoring said image is performed on a separate computing device.

7. The method of claim 2, wherein the step of transforming said electronic representation, is further comprised of:
    detecting one or more visible edges of said first document;
    displaying said electronic representation to a user, and highlighting said one or more visible edges;
    enabling said user to manipulate said one or more highlights; and
    cropping said electronic representation, utilizing the position of said one or more highlights to determine the location of the new borders.

8. The method of claim 2, wherein the step of transforming said electronic representation, is further comprised of:
    detecting one or more visible edges of said first document; and
    cropping said electronic representation, utilizing the position of said one or more visible edges to determine the location of the new borders.

9. The method of claim 2, wherein the step of transforming said electronic representation, such that any geometric distortions are either minimized or fully eliminated is performed on a separate computing device.

10. The method of claim 3, wherein the step of enhancing said electronic representation is performed on a separate computing device.

* * * * *